March 15, 1960  C. D. CHRISTIE  2,928,485
OVERRUNNING TANDEM AXLE
Filed Jan. 14, 1957  2 Sheets-Sheet 1

INVENTOR.
CHESTER D. CHRISTIE
BY
ATTORNEYS

United States Patent Office 2,928,485
Patented Mar. 15, 1960

2,928,485

OVERRUNNING TANDEM AXLE

Chester D. Christie, Shaker Heights, Ohio, assignor to Eaton Manufacturing Company, Cleveland, Ohio, a corporation of Ohio Application January 14, 1957, Serial No. 633,908

2 Claims. (Cl. 180—22)

This invention relates to a tandem axle vehicle design wherein the tandem axles are in series driving relationship and are driven at slightly different speed ratios. Tandem axle vehicles of known design are utilized mainly for the purpose of distributing the gross vehicle load on two rear axles instead of one and also to provide more than one tractive axle under adverse weather conditions when traction is difficult. Many designs provide for driving only one of the tandem axles under all operating conditions while other structures drive both axles at all times through an inner axle torque divider or in series drive relationship.

Both of these adaptations have inherent disadvantages. If only one axle is driven at all times, it is obvious that all of the engine output torque must be applied to the axle to drive the vehicle and consequently, if weather conditions are adverse, there is a great amount of slippage between the tires and the pavement, resulting in power loss and under many conditions, the inability to move the vehicle. A torque divider utilizing an inter-axle differential arrangement adds a considerable expense to the vehicle, greatly increases the unsprung weight and still does not offer a positive means to insure that torque will be applied to all wheels of both driving axles.

Still others have disclosed a series driving relationship of two axles wherein the selective connection of the second axle is controlled by a particular speed ratio in the vehicle transmission. For example, one device discloses a series related structure wherein the second axle becomes a trailing or dead axle when the vehicle transmission is shifted into high gear. The disadvantages of such an arrangement are obvious since the necessity for dividing the torque to a plurality of axles is a condition governed by vehicle speed and road friction conditions rather than the transmission speed ratio.

It is an object of this invention to insure a positive torque dividing means to both axles of a tandem axle vehicle.

Another object is to provide means to drive only one of the axles under normal operating conditions.

Still another object is to provide means to automatically drive both axles when a slipping condition is encountered.

Yet another object is to provide a structure which accomplishes the objects heretofore set forth with a simple and inexpensive mechanism.

These and other objects and advantages will become more apparent from the following detailed description of the device and from the accompanying drawings wherein:

Figure 1 discloses a tandem axle arrangement utilizing the present invention.

Figure 3 is a detail showing of the clutch structure.

Briefly, the novel structure disclosed herein relates to a tandem axle arrangement wherein one of the axles is driven directly from the vehicle propeller shaft and the other axle is drivingly connected to the first mentioned axle by gearing means arranged on the input side of the first axle with an overrunning clutch means arranged in series driving connection with said gearing means in a manner such that the second mentioned axle is free to overrun the gear means. The input speed ratios to the axles are such that the second axle ordinarily overruns the input to the second axle, whereas the first axle is driven by the input to the first axle. When a condition of poor traction is encountered and the first axle slips and consequently rotates faster than the second axle, the input to the second axle then becomes a driving member to the second axle and both axles function as driving axles until the slipping condition is overcome.

Figure 1:
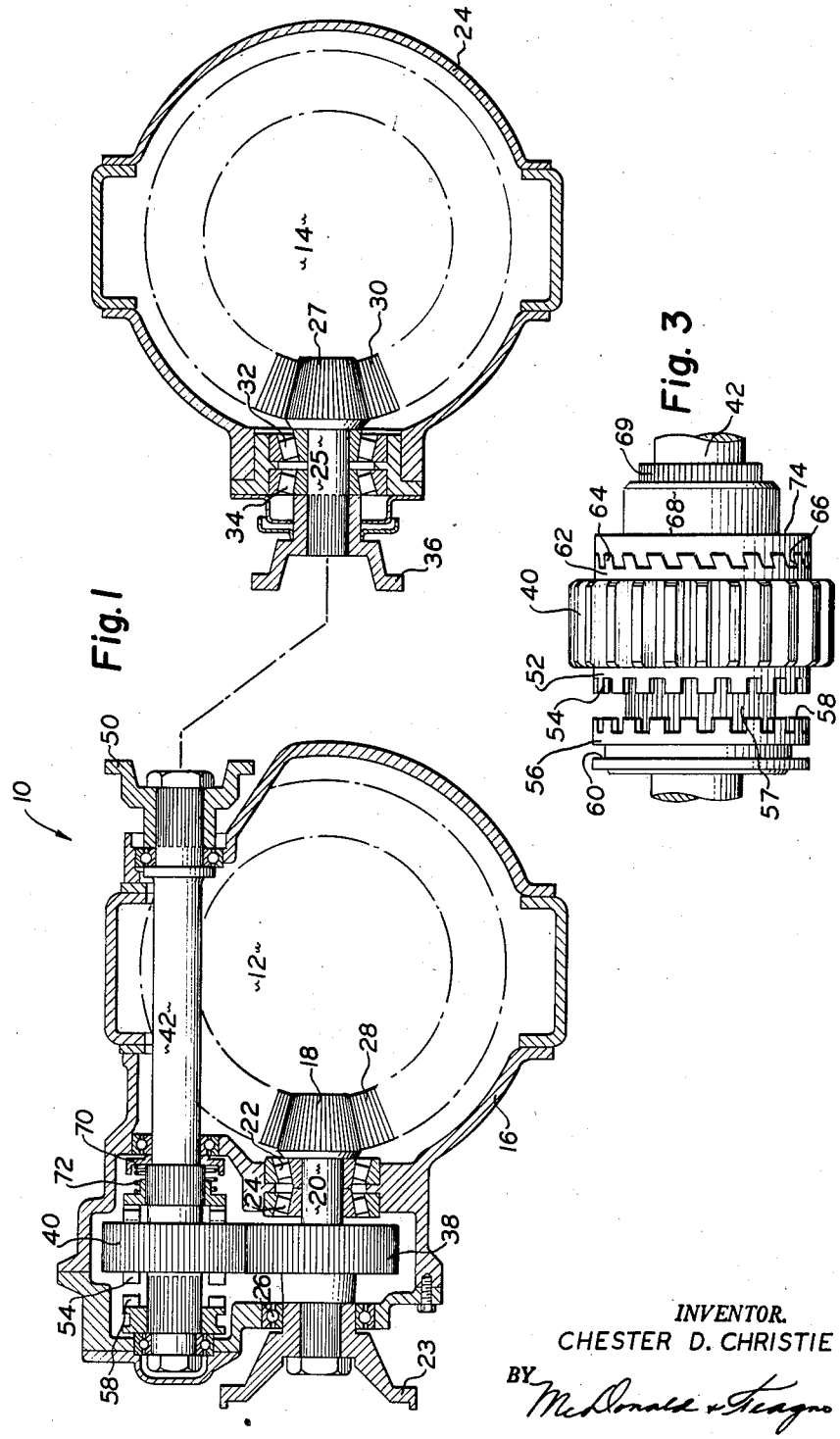
Figure 2:
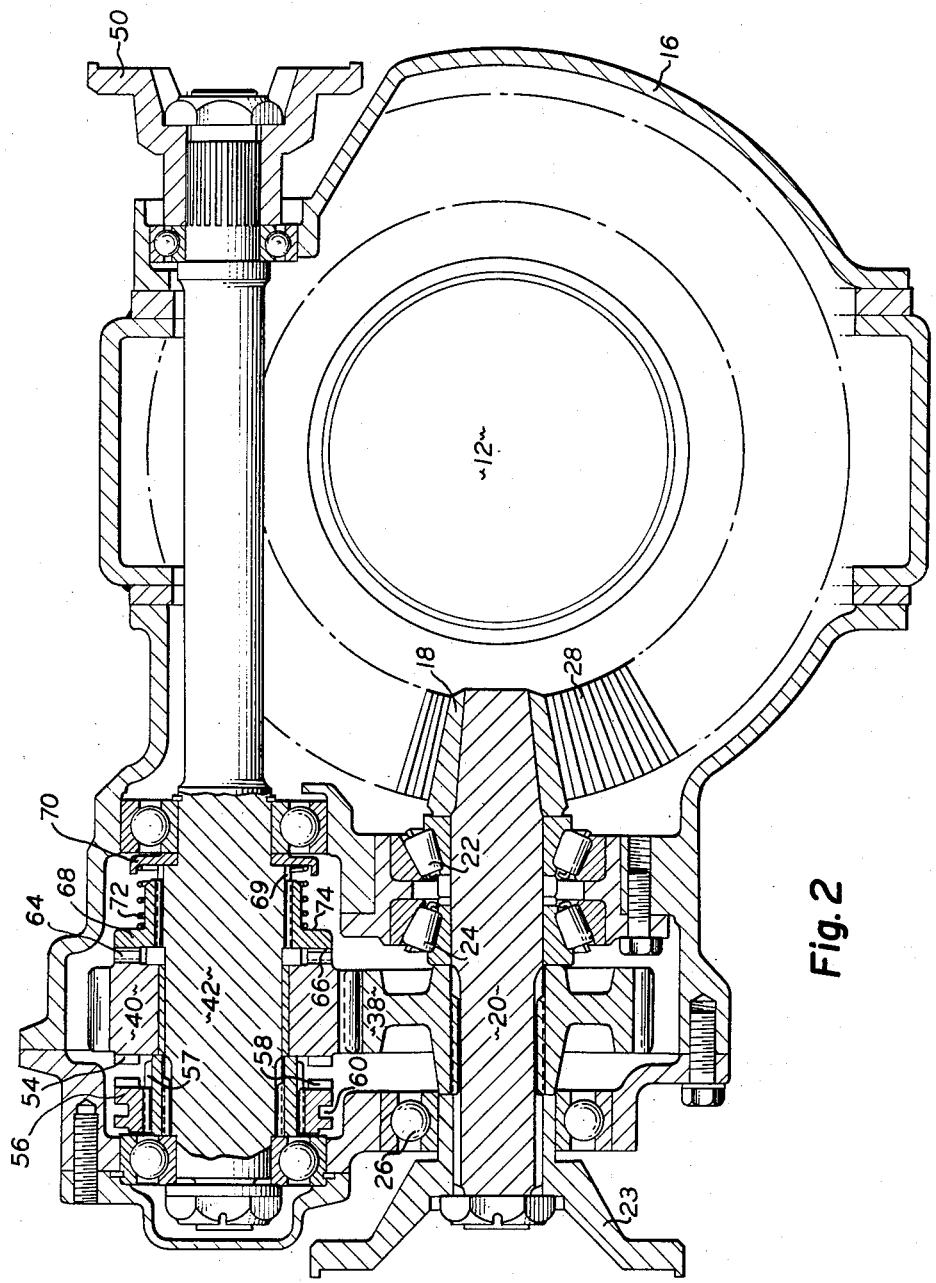
Figure 2 is an enlarged view of a portion of the structure shown in Figure 1.

Referring to the drawing for a more detailed description of the mechanism, Figure 1 illustrates a tandem axle arrangement 10 comprising an axle 12 and an axle 14. The axle 12 is comprised of a casing 16 which rotatably supports the axle shaft (not shown) and an input pinion 18 having a shaft portion 20 supported in bearings 22, 24, and 26. Pinion 18 is adapted to mesh with a bevel ring gear 28 which is also supported in casing 16 by support means which are not shown and form no novel part of the present invention. A universal joint companion flange 23 is fixed to shaft 20 and is adapted to be driven by a vehicle propeller shaft (not shown) through a rear universal joint (not shown). The axle 14 is comprised of a casing 24 which supports a pinion shaft 25, which has secured thereto a pinion 27 meshing with a bevel ring gear 30. Bearings 32 and 34 are provided in housing 24 to support shaft 25 and a universal joint companion flange 36 is splined to shaft 25 and is adapted to be driven by a gear train which is hereinafter described. Pinion shaft 20 of axle 12 has a gear 38 fixed for rotation therewith and meshes with a gear 40 which is mounted for relative rotation with respect to a shaft 42. Gear 40 is provided with a greater number of teeth than the gear 38 so that one full revolution of the gear 38 results in slightly less than one full revolution of gear 40, and consequently, pinion shaft 20 rotates slightly faster than the intermediate shaft 42. A universal joint companion flange 50 is also splined to shaft 42 and is drivingly connected by propeller shaft means to the companion flange 36 of the axle 14. It is to be noted that no idler gear is shown between gears 38 and 40 to enable shaft 42 to rotate in the same direction as pinion shaft 20. These shafts obviously must rotate in the same direction as since they are connected to ground engaging wheels which must rotate in the same direction. Reversal of rotation can be accomplished by an idler gear meshing intermediate gears 38 and 40, or by reverse cutting the pinion gear 27 and ring gear 30 of axle 14. These expedients do not form a novel part of the present invention.

The gear 40, which is journalled on a hub portion of shaft 42, is provided with an axially extending portion 52 which has teeth 54 formed thereon, as shown in Figure 3. An axially movable member 56 is splined for rotation at 57 to a hub portion of shaft 42 and is provided with teeth 58 which are adapted to mesh with the teeth 54 formed on portion 52 of gear 40. An annular recess 60 is formed in member 56 and is adapted to receive a conventional bifurcated means to effect axial shifting of member 56 into and out of engagement with teeth 54 formed on portion 52. The clutch teeth 54 and 58 are provided for engagement whenever it is desired to operate the vehicle in reverse so that there is a positive two axle drive in reverse gear. A conventional shifting means to shift member 56 can be either separately operable or conjointly operable with the reverse mechanism in the vehicle transmission.

An axially extending portion 62 is also provided on gear 40 and has an annulus of one-way clutch teeth 64 formed thereon. These teeth are adapted to mesh with a plurality of teeth 66 formed on a spring biased, axially movable collar member 68 which is splined at 69 to a hub portion of shaft 42. A reaction ring 70 axially confines a coil spring 72 which acts against a surface 74 of collar 68 to maintain teeth 64 and 66 in an engaged position. Viewing the structure from the left in Figure 3, and considering the movement of the elements to be counterclockwise, teeth 64 and 66 are moved to a disengaged position due to the axial component of the disengaging force produced because of the inclined formation of the clutch teeth, when the member 68 is rotating faster than the gear 40. When gear 40 tends to overspeed member 68, the angular disposition of the clutch teeth tends to lock the teeth in an engaged position. A typical operating cycle of the device is set forth as follows.

Considering the vehicle to be at a standstill and it is desired to accelerate the vehicle to an operating speed, pinion shaft 20 and gear 38 are rotated by the propeller shaft (not shown) which results in rotation of pinion 18 and ring gear 28 of the front axle. Also, due to the lesser number of teeth in gear 38 than in gear 40, gear 40 rotates at a slightly lower speed than the pinion shaft 20. When the vehicle begins to move, ring gears 28 and 30 of axles 12 and 14 respectively, are constrained to rotate at the same speed by virtue of being geared together to the ground. Consequently, pinion shaft 25 of axle 14, shaft 42, collar member 68, and clutch teeth 66 are rotating faster than gear 40 and clutch teeth 64 which results in an overrunning condition of teeth 66 with respect to teeth 64. If there is no slippage of the axle with respect to the ground engaging surface, this mode of operation will continue; that is, axle 12 will act as a driving axle and axle 14 will operate as a dead or non-driving axle. It is to be noted that if the constant overrun of clutch teeth 66 with respect to clutch teeth 64 becomes undesirable or harmful, a speed responsive means can be provided to positively shift collar 68 to the right (as viewed in Figure 3) so that the teeth will disengage when the vehicle attains a predetermined speed.

If a condition is encountered wherein it is desired to operate the vehicle on a relatively slipper surface, the propeller shaft (not shown) imparts rotation to pinion shaft 20 of axle 12 and consequently, drives axle 12. If conditions are such that this axle slips on a ground engaging surface before the vehicle moves, axle 12 will overspeed with respect to axle 14, resulting in a condition wherein the member 62 becomes a driving member with respect to collar 68 and clutch teeth 64 act to positively drive clutch teeth 66, and axle 14 therefore becomes a driving axle along with axle 12. When the vehicle is accelerated sufficiently to overcome the slipping condition, shaft 42, collar 68, and clutch teeth 66 again overrun member 62 and clutch teeth 64 and axle 14 again becomes a dead or nondriving axle.

It is obvious from the above description that a tandem axle arrangement has been disclosed wherein only one of the axles ordinarily is a driving axle, but when a slipping condition is encountered, the other axle automatically becomes a driving axle along with the first axle and this driving condition remains until the slipping condition is overcome.

While the present invention has been described in connection with certain specific embodiments, it is to be understood that the foregoing description is merely exemplary and that the concept of this invention is susceptible of numerous other modifications, variations, and applications which will be apparent to persons skilled in the art. The invention is to be limited, therefore, only by the broad scope of the appended claims.

What I claim is:

1. An in-series in-line driving arrangement for driving tandem axles, said driving arrangement including an input shaft, pinion means fixed for rotation with said input shaft, axle ring gear means meshing with said pinion means for rotating the forward one of the tandem axles, first gear means conjointly rotatable with and coaxially mounted on said input shaft forward of said one tandem axle, intermediate shaft means disposed parallel to said input shaft and extending rearwardly therefrom, second gear means journalled on said intermediate shaft means and meshing with said first gear means, said second gear means having a greater number of teeth than said first gear means for normally constraining said second gear means to rotate at a lower speed than said first gear means, unidirectional driving clutch means disposed adjacent said second gear means forward of said one tandem axle for operatively connecting the second gear means to the intermediate shaft means, a second pinion means disposed rearwardly of said one tandem axle and fixed for rotation with said intermediate shaft means, and second axle ring gear means meshing with said pinion means for rotating the rearward tandem axle during slipping conditions of said one tandem axle.

2. The driving arrangement as set forth in claim 1 wherein said unidirectional driving clutch means includes a collar member axially movably mounted on the intermediate shaft means for rotation therewith, means normally urging said collar member into frictional driving engagement with a part of the second gear means, and means for enabling positive drive of the tandem axles in reverse, said last named means comprising a second member axially movably mounted on the intermediate shaft means for rotation therewith and means for urging the second member into frictional driving engagement with another part of the second gear means.

References Cited in the file of this patent

UNITED STATES PATENTS

| | | |
|---|---|---|
| 1,738,212 | Smith | Dec. 3, 1929 |
| 1,927,276 | Bryan | Sept. 19, 1933 |
| 2,107,072 | Herrington | Feb. 1, 1938 |
| 2,667,087 | Myers | Jan. 26, 1954 |
| 2,699,852 | Cost | Jan. 18, 1955 |
| 2,711,222 | Bock | June 21, 1955 |

FOREIGN PATENTS

| | | |
|---|---|---|
| 1,056,147 | France | Oct. 21, 1953 |

(Corresponding U.S. 2,851,115, Sept. 9, 1958)